(12) United States Patent
Brewer et al.

(10) Patent No.: US 10,829,197 B2
(45) Date of Patent: Nov. 10, 2020

(54) GURNEY FLAP

(71) Applicant: CLAVERHAM LIMITED, Solihull (GB)

(72) Inventors: Paul Brewer, Bristol (GB); Suat Bekircan, Bath (GB)

(73) Assignee: CLAVERHAM LIMITED, Bristol (GB)

( * ) Notice: Subject to any disclaimer, the term of this patent is extended or adjusted under 35 U.S.C. 154(b) by 378 days.

(21) Appl. No.: 15/835,640

(22) Filed: Dec. 8, 2017

(65) Prior Publication Data

US 2018/0162515 A1 Jun. 14, 2018

(30) Foreign Application Priority Data

Dec. 9, 2016 (EP) .................................... 16203156

(51) Int. Cl.

| | |
|---|---|
| *B64C 9/02* | (2006.01) |
| *B64C 9/34* | (2006.01) |
| *B64C 27/615* | (2006.01) |
| *B64C 9/08* | (2006.01) |
| *B64C 3/50* | (2006.01) |

(Continued)

(52) U.S. Cl.
CPC .................. *B64C 9/02* (2013.01); *B64C 3/50* (2013.01); *B64C 9/08* (2013.01); *B64C 9/34* (2013.01); *B64C 27/615* (2013.01); *B64C 2003/145* (2013.01); *B64C 2027/7266* (2013.01); *Y02T 50/12* (2013.01); *Y02T 50/14* (2013.01); *Y02T 50/32* (2013.01); *Y02T 50/34* (2013.01)

(58) Field of Classification Search
CPC .... B64C 9/02; B64C 3/50; B64C 9/08; B64C 9/34; B64C 27/615; B64C 2003/145; B64C 2027/7266; Y02T 50/12; Y02T 50/14; Y02T 50/32; Y02T 50/34
See application file for complete search history.

(56) References Cited

U.S. PATENT DOCUMENTS 5,236,149 A * 8/1993 MacKay ................. B64C 3/141
 244/206
5,492,448 A * 2/1996 Perry ........................ B64C 3/14
 416/228

(Continued)

FOREIGN PATENT DOCUMENTS

EP 1666355 A1 6/2006

OTHER PUBLICATIONS

European Search Report for Application No. 16203156.1-1754 dated May 26, 2017, 12 Pages.

(Continued)

*Primary Examiner* — Rodney A Bonnette
(74) *Attorney, Agent, or Firm* — Cantor Colburn LLP

(57) ABSTRACT

A gurney flap arrangement includes: an airfoil 2 with a trailing edge 6 and an opening 14 in a surface 8 of the airfoil 2; a gurney flap 1 having a first position in which at least a portion of the gurney flap 1 extends through the opening 14 and projects outwardly from the airfoil surface 8, and a second position in which the gurney flap 1 does not project from the airfoil surface 8 or projects outwardly from the airfoil surface 8 to a lesser extent; and a gurney flap actuator 3 for moving the gurney flap 1 between at least the first position and the second position.

14 Claims, 2 Drawing Sheets

(51) Int. Cl.
       *B64C 3/14*          (2006.01)
       *B64C 27/72*         (2006.01)

(56) References Cited

U.S. PATENT DOCUMENTS

| | | | | |
|---|---|---|---|---|
| 6,565,045 | B1* | 5/2003 | Correge | B64C 3/14 |
| | | | | 244/212 |
| 7,740,205 | B1* | 6/2010 | Nahas | B64C 9/20 |
| | | | | 244/198 |
| 7,757,991 | B2 | 7/2010 | Tanabe et al. | |
| 8,684,690 | B2 | 4/2014 | Gandhi | |
| 8,695,926 | B2 | 4/2014 | Brewer et al. | |
| 8,757,557 | B2 | 6/2014 | Brewer et al. | |
| 2012/0261508 | A1 | 10/2012 | Brewer et al. | |
| 2012/0292155 | A1* | 11/2012 | Gunter | F03G 7/065 |
| | | | | 192/82 T |

OTHER PUBLICATIONS

Woodgate, et al. "Method for calculating rotors with active Gurney Flaps", Journal of Aircraft, AIAA, vol. 53, No. 3 May 1, 2016, pp. 605-626.

* cited by examiner

GURNEY FLAP

FOREIGN PRIORITY

This application claims priority to European Patent Application No. 16203156.1 filed Dec. 9, 2016, the entire contents of which is incorporated herein by reference.

TECHNICAL FIELD

The present invention relates to a gurney flap arrangement in which an airfoil includes a gurney flap, for example an airfoil for an aircraft.

BACKGROUND

Airfoils are used in many applications, typically to provide lift in a desired direction. A gurney flap, sometimes known as a wickerbill, may be used to improve the performance of the airfoil, and in its simplest form consists of a small tab projecting outwardly from the pressure side surface. Gurney flaps find particular use in applications where high amounts of lift are required, for example in a rotary wing aircraft such as a helicopter. A gurney flap projects outward from the airfoil surface so that there is a distance between the outer edge of the gurney flap and the trailing edge of the airfoil. In this way a gurney flap can be distinguished from other types of airfoil flaps, such as trailing edge flaps used to extend the airfoil surface area, where the flap emerges from the trailing edge and is not spaced apart from it.

In order to control the amount of lift provided by the airfoils, some aircraft include deployable gurney flaps, which may be either stowed or deployed as needed. When deployed, the gurney flaps increase the lift provided by the airfoils, but increase their drag. The gurney flaps are stowed as needed to reduce drag. In some cases, the airfoil includes an opening into which the gurney flap can retract, thus withdrawing into the envelope of the airfoil. Such an opening necessarily provides ingress to particulates and atmospheric debris like dust, ice, water, insects etc., which in turn can cause wear fatigue, and degradation of the components.

U.S. Pat. Nos. 8,695,926 and 8,757,557 disclose prior art deployable gurney flap arrangements. In both of U.S. Pat. Nos. 8,695,926 and 8,757,557 a gurney flap arrangement uses a pivot with rotation used to move the gurney flap between a retracted position and a deployed position. In the retracted position of U.S. Pat. No. 8,695,926 the gurney flap lays flat along the airfoil pressure side, and in the deployed position of U.S. Pat. No. 8,695,926 the gurney flap forms a ramp at an incline to the airfoil pressure side. In U.S. Pat. No. 8,757,557 the main rotating part of the gurney flap arrangement remains within the envelope of the airfoil, with a gurney flap section extending perpendicular from the main rotating part at a location close to the trailing edge of the airfoil and spaced apart from the pivot. In the retracted position the flap section is within the envelope of the airfoil and in the deployed position the flap section protrudes from the airfoil pressure side and is perpendicular to the surface of the pressure side.

SUMMARY

Viewed from a first aspect, the present invention provides a gurney flap arrangement comprising: an airfoil with a trailing edge and an opening in a surface of the airfoil; a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and a gurney flap actuator for moving the gurney flap between at least the first position and the second position; wherein the gurney flap actuator is arranged to move the gurney flap in a direction that extends along an inclined angle with less than 90 degrees between the gurney flap and a part of the airfoil surface extending from the opening toward the trailing edge such that when moving from the second position into the first position a distal edge of the gurney flap moves both outward from the airfoil surface and also in a direction extending along the airfoil surface toward the trailing edge.

Advantageously, with this arrangement the movement of the gurney flap as it deploys is a sliding inclined movement toward the trailing edge. In devices described in the prior art such as in U.S. Pat. Nos. 8,695,926 and 8,757,557 the direction of movement of the gurney flap is primarily perpendicular to the airfoil surface. However in the above arrangement the direction of movement of the gurney flap is inclined at an angle. As a result the proposed gurney flap may be retracted into a relatively wide section of the airfoil body, whilst still being deployable to affect the airflow at the trailing edge where the airfoil body is too narrow to receive a retracted gurney flap. For maximum lift the ideal position for the gurney flap is at the extreme of the trailing edge, but at this point the airfoil is not deep enough to receive the retracted gurney flap. The arrangement proposed above allows for the distal edge of the gurney flap to be moved toward the trailing edge of the airfoil as it is deployed. The opening for the gurney flap may be set back from the trailing edge and the gurney flap can withdraw at an incline into the airfoil.

The movement of the gurney flap into the first position may place the distal edge of the gurney flap alongside the trailing edge of the airfoil, with a spacing between the distal edge of the flap and the trailing edge of the airfoil. When it is alongside the trailing edge then the distal edge of the gurney flap may be located on or close to a line extending from the trailing edge along a perpendicular to the airfoil. This perpendicular line may be perpendicular to an effective direction of the airfoil, which may be a tangent to the pressure side surface at the trailing edge and/or at the location of the opening for the gurney flap. When the distal edge is close to this perpendicular line in the first position, i.e. rather than being exactly on the perpendicular line, then it may be within a distance of up to 10% of the spacing between the distal edge of the flap and the trailing edge of the airfoil.

The spacing between the distal edge of the flap and the trailing edge of the airfoil may be similar to the normal extension of prior art gurney flaps from the airfoil surface when the gurney flap is in the first position. For example, this spacing may be 0.5% to 10% of a chord length of the airfoil, optionally 1% to 2% of the chord length.

In the first position the portion of the gurney flap that extends outward of the airfoil pressure surface may extend at an incline to the airfoil pressure surface, for example at between 10° to 70° from a tangent to the airfoil pressure surface. The incline of the gurney flap may be along a line that is approximately aligned with one of or lies in between (i) a first line bisecting the airfoil cross-section at a midpoint between the pressure side surface and suction side surface and (ii) a second line that is parallel with the suction surface of the airfoil. The direction of movement of the gurney flap may be along the same line or along another line that is approximately aligned with one of or lies in between (i) a first line bisecting the airfoil cross-section at a midpoint between the pressure side surface and suction side surface and (ii) a second line that is parallel with the suction surface of the airfoil. Inclines of this type can aid in maximizing the space for withdrawing the gurney flap into the airfoil envelope and the space for housing the gurney flap actuator, whilst allowing for the advantage of placing the distal edge of the gurney flap close to the trailing edge of the blade.

In the first position, the gurney flap may be substantially outside the airfoil, such that only a minor portion of its length remains within the airfoil. The gurney flap may not change orientation, and may only translate as it moves between the first and second positions. That is, the gurney flap's orientation may be the same in both first and second positions, and in this case the width of the gurney flap may be aligned with the inclined angle of movement of the flap.

In the second position, the gurney flap may be withdrawn within or flush with an envelope of the airfoil (for example, flush with the surface of the airfoil), thereby reducing its drag as compared to that of the first position. In the second position, the gurney flap may be entirely within the envelope of the airfoil.

The airfoil may have any particular geometry suitable for its intended purpose. It may comprise a root portion, an intermediate portion, and a tip portion. It may comprise a pressure side, a suction side, a leading edge, and a trailing edge. The opening may be nearer the trailing edge than the leading edge, and may be proximate the trailing edge. The opening may be in the pressure side surface of the airfoil. In some examples the airfoil is a rotor blade for a rotary wing aircraft such as a helicopter rotor blade. There are particular advantages from using a deployable gurney flap in this type of rotor blade since it allows for the lift from the rotor blade to be varied depending on the rotational position of the rotor blade.

The opening may have any geometry commensurate with the profile of the gurney flap, to allow the gurney flap to extend therethrough. The gurney flap may have an elongate shape. The length of the gurney flap may extend along at least a portion of the length of the span of the airfoil. The gurney flap can be considered as having a length in a direction that is generally parallel with the airfoil surface, for example along the span direction, and a width that is inclined to the airfoil surface, with the depth or thickness of the gurney flap being perpendicular to both the length and width directions.

The gurney flap may be straight, or it may be curved along its length. The curve may be set based on the shape of the airfoil. Typically a gurney flap has a relatively large length and a relatively short width, with the thickness being smaller than the width, and also generally with the thickness being smaller than the extent to which the gurney flap projects outward from the airfoil surface in the first position. The opening may comprise a slot, wherein in the first position the gurney flap extends out of the slot, and wherein in the second position the gurney flap is withdrawn into the slot. The opening may be a constant width and may mimic the longitudinal shape of the airfoil and/or the shape of the gurney flap.

The gurney flap may be made of a flexible and corrosion resistant material, such as a plastic, composite or stainless steel material.

The gurney flap actuator may include a suitable driving mechanism. An electrical drive such as a solenoid or electric motor may be used. The gurney flap actuator may include a mechanical linkage between the driving mechanism and the gurney flap, such as gearing or levers.

There may be a seal disposed about the opening to seal a gap in the opening between the gurney flap and the airfoil. The gap between the gurney flap and the airfoil may surround some of or all of the gurney flap within the opening. The seal may bridge some of or all of the gap between the gurney flap and the airfoil. Therefore, the gurney flap may be disposed substantially within the centre of the opening, and the seal may be disposed about the gurney flap on all sides within the opening, thereby closing off the gap and sealing the inside of the airfoil from the outside environment.

The seal may comprise a seal body made of a resilient material such as a rubber or plastic material. The seal body made of a single homogeneous material. That is, the seal body may have a uniform composition throughout. Alternatively a composite material may be used. The seal body may comprise a self-lubricating material, such as polytetrafluoroethylene (PTFE), graphite, or molybdenum di-sulphide. Flexible metal materials may be used in the seal body, optionally in conjunction with a rubber or plastic material. The seal body may be sufficiently flexible and durable to withstand the atmosphere experienced by the airfoil during use. The seal body may be flexible enough to deform as desired when the gurney flap is in first and second positions, and to return to a relaxed state when needed.

The seal body may comprise a scraper lip in contact with the gurney flap and configured to bear against a side of the gurney flap during transition of the gurney flap between first and second positions. The gurney flap may therefore move relative to the scraper lip such that the scraper lip slides along its length. The scraper lip may serve to clean debris off the side of the gurney flap as it moves to transition from the first position to the second position, thereby sliding past the scraper lip. The seal body may comprise one, two, three, or four scraper lips bearing against one, two, three, or four sides of the gurney flap.

The seal may comprise a biasing means to urge the seal body to bear against the gurney flap, thereby ensuring sufficient sealing of the interior space of the airfoil from the external environment. The biasing means may serve to bias the scraper lip(s) against the gurney flap for cleaning debris off it during stowing (i.e. during transition from the first position to the second position). The biasing means may be a spring embedded within the seal body, or any other suitable resilient formation. Alternatively, the biasing means may be an inherent property of the seal body, which may therefore be elastic and resilient enough to bear against the gurney flap with sufficient force to provide an acceptable seal.

The seal may comprise a slot, for example a slot extending through the seal body, and in the first position the gurney flap may extend out of the slot, and in the second position the gurney flap may be withdrawn into the slot. When the gurney flap is stowed (i.e. in the second position) its outermost end surface may be flush with the outermost surface of the seal, both of which surfaces may be flush with the pressure side surface of the airfoil. The seal may curve outwards from the surface of the airfoil so that gurney flap may be easily actuated outward, and so that the scraper surfaces are angled in contact with the gurney flap and are hence better positioned to scrape debris from the sides as the gurney flap is retracted to the second position. Alternatively, the scraper lip(s) may meet the side of the gurney flap at right angles.

The gurney flap arrangement may include multiple gurney flaps spaced apart on the airfoil, with each gurney flap having a similar inclined arrangement. The multiple gurney flaps may have a shared gurney flap actuator, or each gurney flap may have its own gurney flap actuator.

According to a second aspect of the invention there is provided a method for operating a gurney flap arrangement comprising: an airfoil with a trailing edge and an opening in a surface of the airfoil; a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and a gurney flap actuator; the method comprising using the gurney flap actuator to move the gurney flap between at least the first position and the second position; wherein the gurney flap actuator moves the gurney flap in a direction that extends along an inclined angle with less than 90 degrees between the gurney flap and a part of the airfoil surface extending from the opening toward the trailing edge such that when moving from the second position into the first position a distal edge of the gurney flap moves both outward from the airfoil surface and also in a direction extending along the airfoil surface toward the trailing edge.

The method may comprise using a gurney flap arrangement having any of the features described above with respect to the first aspect.

BRIEF DESCRIPTION OF THE DRAWINGS

An embodiment of the present invention will now be described by way of example only and with reference to the accompanying drawings in which.

DETAILED DESCRIPTION

Figure 1:
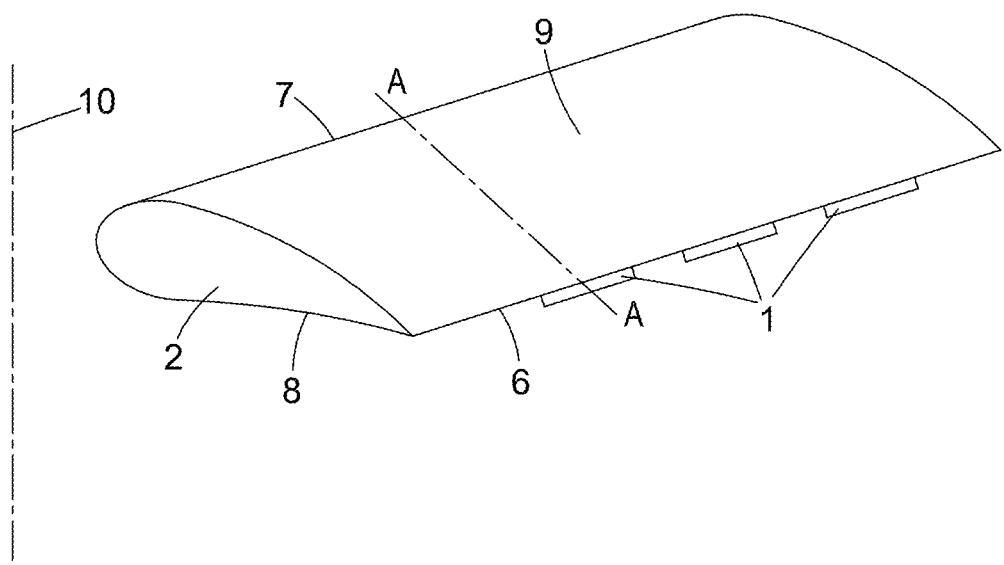
FIG. 1 shows an exemplary airfoil with gurney flaps close to the airfoil trailing edge.

As shown in the Figures, an airfoil 2 is provided with number of deployable inclined gurney flaps 1. The airfoil 2 in this example is a main rotor blade 2 of a rotary wing aircraft mounted to a rotor hub, which has a rotation axis 10. As seen in FIG. 1 the airfoil 2 has a pressure side 8, a suction side 9, a leading edge 7, and a trailing edge 6. The gurney flaps 1 are provided at the pressure side 8 of the airfoil close to the airfoil trailing edge 6. The gurney flaps 1 are deployed to increase the rotor blade lift during some parts of blade rotation, with the deployed position being shown in FIG. 1 and being more clearly shown in FIGS. 2A and 2C. During other parts of blade rotation the gurney flap 1 is retracted, as shown in FIG. 2B, in order to decrease drag.

Figure 2A:
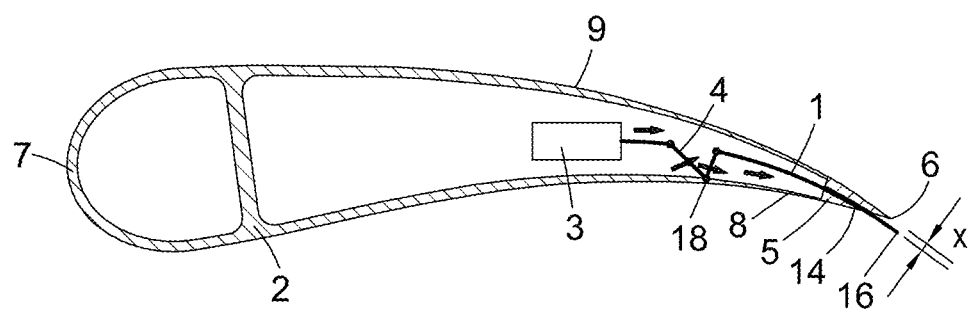
FIG. 2A shows a cross-section of the airfoil of FIG. 1 along line A showing the gurney flap arrangement with the gurney flap deployed to a first position and a schematic representation of the actuation mechanism.
Figure 2B:
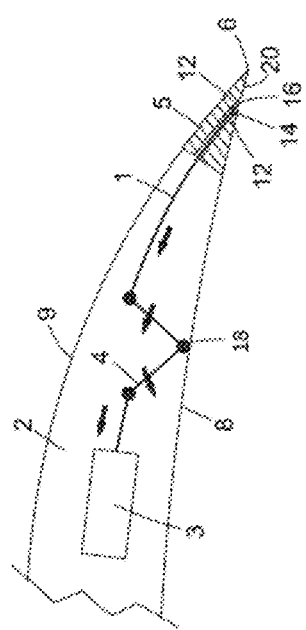
FIG. 2B shows a view of a part of FIG. 2A with the gurney flap retracted to a second position and FIG. 2C shows a view of a part of FIG. 2A with the gurney flap deployed.
Figure 2C:
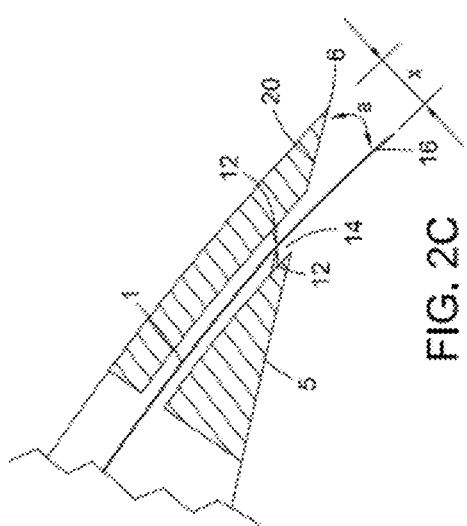

As seen in FIGS. 2A, 2B and 2C the gurney flap 1 is moved between the first position and the second position using a gurney flap actuator 3. The movement of the gurney flap is such that a distal edge 16 of the gurney flap 1 moves both outward from the airfoil surface 8 and also in a direction extending along the airfoil pressure surface 8 toward the trailing edge 6 of the airfoil 2. The gurney flap 1 may move in any direction extending along the airfoil pressure surface 8 toward the trailing edge 6. In this example it moves generally parallel with the airfoil suction surface 9, but it will be readily understood that other directions of movement are possible. This actuator 3 may include a solenoid or a motor, for example. The actuator 3 in this example produces a linear movement, and this movement is coupled to the gurney flap 1 via a mechanical linkage including a lever mechanism 4 connected to a pivot 18. This allows the flap 1 to be slid along a direction that is at an inclined angle a to the surface of the pressure side 8, and this inclined direction may be generally parallel with the surface of the suction side 9 as shown in the Figures. The gurney flap 1 moves into and out of the airfoil 2 through a self-lubricating housing 5.

When the gurney flap 1 is in the first position, as shown in FIGS. 2A and 2C, the distal edge 16 of the gurney flap 1 is alongside the trailing edge 6 of the airfoil 2. The distal edge 16 of the flap 1 and the trailing edge 6 of the airfoil 2 are spaced apart by a distance x, as shown. This distance x is equivalent to the normal projection of a gurney flap 1 fitted to extend perpendicular to the surface of the airfoil pressure side 8, for example the distance x may be 1%-2% of the blade chord length. The protruding part of the gurney flap 1 is at an angle a to the surface of the pressure side 8 of the airfoil 2. The proposed inclined gurney flap 1 can hence present the same effective area as a prior art gurney flaps such as in U.S. Pat. Nos. 8,695,926 and 8,757,557, but with the distal edge 16 of the gurney flap 1 closer to the trailing edge 6 of the airfoil 2 due to the inclined flap 1 and inclined actuation direction.

As a part of the self-lubricating housing 5, as shown in FIG. 2B, a dynamic seal 12 can be disposed within the opening 14 in the airfoil surrounding the gurney flap 1, bridging and covering a gap between the gurney flap 1 and the edge of the opening 14. The seal 12 is flexible and has a slot (e.g. an elongate letterbox shaped hole) through which the gurney flap 1 passes. The edge of the slot of the seal 12 defines a scraper lip, which is urged into contact with the gurney flap 1 by a spring (not shown).

The seal 12 in this example is bonded on to the structure of the airfoil 2 around the edge of the opening 14. The gurney flap 1 is shown in the first (deployed) position in FIG. 2A and hence extends through the slot in the seal 12 and projects from the surface of the airfoil 2. In the first position the gurney flap 1 increases the lift of the airfoil 2. The seal 12 can have an overall outward curvature (albeit a small curvature) so that the scraper lips meet the gurney flap 1 at an angle. The scraper lips continuously contact the sides and edges of the gurney flap 1, and the seal 12 is energized continuously by the spring (or any other suitable elastomeric or metallic spring energizers) to maintain this contact.

The gurney flap 1 is moved between the first position and the second position using the gurney flap actuator 3 via any suitable mechanism, such as via linkage 4, 6, a shown schematically in the Figures. The gurney flap 1 may move in translation only, i.e. sliding without rotation, or it may both slide and rotate as it moves between the first and the second positions. As the gurney flap 1 is withdrawn into the interior of the airfoil 2, it slides past scraper lips of the seal 12, which clean off any accumulated debris. Thus, not only does the seal 12 prevent ingress of atmospheric debris by sealing the gap in the opening 14, but the scraper lips ensure that no debris is transported into the airfoil 2 when the gurney flap 1 is stowed.

In the second position, as shown in FIG. 2A, the distal edge 16 of the gurney flap 1 can be flush with the outer surface of the airfoil 2. The gurney flap 1 can be withdrawn into the opening 14 so that the distal edge 16 of the flap 1 and the seal 12 are flush with the pressure side surface of the airfoil 2.

The seal 12 may be made of self-lubricated material such as PTFE, graphite, molybdenum di-sulphide or any other suitable self-lubricated elastomeric material. The gurney flap 1 may be made of metallic materials, non-metallic composite materials or plastics. The contact surfaces of the gurney flap 1 may also be coated, for example with graphite or tungsten carbide to provide high wear resistance and self-lubrication.

While the arrangements have been shown and described with reference to exemplary embodiments, those skilled in the art will appreciate that changes and/or modifications may be made thereto without departing from the scope of the present invention as defined by the appended claims.

The invention claimed is:

1. A gurney flap arrangement comprising:
an airfoil with a trailing edge and an opening in a surface of the airfoil;
a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and
a gurney flap actuator for moving the gurney flap between at least the first position and the second position;
wherein the gurney flap actuator is arranged to move the gurney flap in a direction that extends along an inclined angle with less than 90 degrees between the gurney flap and a part of the airfoil surface extending from the opening toward the trailing edge, with a sliding inclined movement toward the trailing edge, such that when moving from the second position into the first position a distal edge of the gurney flap moves both outward from the airfoil surface and also in a direction extending along the airfoil surface toward the trailing edge;
wherein the movement of the gurney flap into the first position places the distal edge of the gurney flap alongside the trailing edge of the airfoil, with a spacing between the distal edge and the trailing edge of the airfoil; and
wherein when the gurney flap is in the first position with the distal edge alongside the trailing edge then the distal edge of the gurney flap is located on or close to a line extending from the trailing edge along a line perpendicular to the airfoil.

2. A gurney flap arrangement as claimed in claim 1, wherein the airfoil is a rotor blade for a rotary wing aircraft.

3. A gurney flap arrangement as claimed in claim 1, wherein when the gurney flap is in the first position a spacing between the distal edge and the trailing edge of the airfoil 1% to 2% of the chord length.

4. A gurney flap arrangement as claimed in claim 1, wherein the perpendicular line is perpendicular to a tangent to the pressure side surface at the trailing edge.

5. A gurney flap arrangement as claimed in claim 1, wherein when the gurney flap is in the first position a spacing between the distal edge and the trailing edge of the airfoil is 0.5% to 10% of a chord length of the airfoil.

6. A gurney flap arrangement as claimed in claim 1, wherein when the gurney flap is in the first position the portion of the gurney flap that extends outward of the airfoil pressure surface extends at an incline to the airfoil pressure surface at between 10° to 70° from a tangent to the airfoil pressure surface.

7. A gurney flap arrangement as claimed in claim 1, wherein an incline of the gurney flap and/or of the direction of movement of the gurney flap is along a line that is aligned with one of or lies in between (i) a first line bisecting the airfoil cross-section at a mid-point between the pressure side surface and suction side surface and (ii) a second line that is parallel with the suction surface of the airfoil.

8. A gurney flap arrangement as claimed in claim 1, wherein the gurney flap does not change orientation as it moves between the first and second positions such that the width of the gurney flap is aligned with the inclined angle of movement of the flap.

9. A gurney flap arrangement as claimed in claim 1, wherein when the gurney flap is in the second position, the gurney flap is withdrawn within or flush with an envelope of the airfoil.

10. A gurney flap arrangement as claimed in claim 1, wherein the airfoil comprises a pressure side, a suction side, a leading edge, and a trailing edge, and wherein the opening is in the pressure side of the airfoil close to the trailing edge.

11. A gurney flap arrangement as claimed in claim 1, wherein the gurney flap actuator includes a driving mechanism and a mechanical linkage between the driving mechanism and the gurney flap.

12. A gurney flap arrangement comprising:
an airfoil with a trailing edge and an opening in a surface of the airfoil;
a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and
a gurney flap actuator for moving the gurney flap between at least the first position and the second position;
wherein the gurney flap actuator is arranged to move the gurney flap in a direction that extends along an inclined angle with less than 90 degrees between the gurney flap and a part of the airfoil surface extending from the opening toward the trailing edge such that when moving from the second position into the first position a distal edge of the gurney flap moves both outward from the airfoil surface and also in a direction extending along the airfoil surface toward the trailing edge;
the arrangement further comprising:
a seal disposed about the opening to seal a gap in the opening between the gurney flap and the airfoil, wherein the seal comprises a seal body made of a resilient material, and the seal body includes a scraper lip in contact with the gurney flap and configured to bear against a side of the gurney flap during transition of the gurney flap between first and second positions.

13. A gurney flap arrangement as claimed in claim 12, wherein the seal comprises a biasing means to urge the seal body to bear against the gurney flap.

14. A method for operating a gurney flap arrangement comprising: an airfoil with a trailing edge and an opening in a surface of the airfoil; a gurney flap having a first position in which at least a portion of the gurney flap extends through the opening and projects outwardly from the airfoil surface, and a second position in which the gurney flap does not project from the airfoil surface or projects outwardly from the airfoil surface to a lesser extent; and a gurney flap actuator; the method comprising:

using the gurney flap actuator to move the gurney flap between at least the first position and the second position; and
wherein the gurney flap actuator moves the gurney flap in a direction that extends along an inclined angle with less than 90 degrees between the gurney flap and a part of the airfoil surface extending from the opening toward the trailing edge, with a sliding inclined movement toward the trailing edge, such that when moving from the second position into the first position a distal edge of the gurney flap moves both outward from the airfoil surface and also in a direction extending along the airfoil surface toward the trailing edge;
wherein the movement of the gurney flap into the first position places the distal edge of the gurney flap alongside the trailing edge of the airfoil, with a spacing between the distal edge and the trailing edge of the airfoil; and
wherein when the gurney flap is in the first position with the distal edge alongside the trailing edge then the distal edge of the gurney flap is located on or close to a line extending from the trailing edge along a line perpendicular to the airfoil.

\* \* \* \* \*